United States Patent [19]

Fried

[11] Patent Number: 5,172,875
[45] Date of Patent: Dec. 22, 1992

[54] SPACE LAUNCHER AND METHOD FOR LAUNCHING OBJECTS INTO SPACE

[76] Inventor: Israel Fried, c/o 1920 N St., NW. - Suite 510, Washington, D.C. 20036

[21] Appl. No.: 329,534

[22] Filed: Mar. 28, 1989

[30] Foreign Application Priority Data

Mar. 30, 1988 [IL] Israel .................................. 85926
Mar. 30, 1988 [IL] Israel .................................. 85927

[51] Int. Cl.$^5$ .............................................. B64G 1/40
[52] U.S. Cl. .............................. 244/158 R; 244/172; 102/377
[58] Field of Search .................... 244/158 R, 172, 63; 102/377, 378

[56] References Cited

U.S. PATENT DOCUMENTS

| | | | |
|---|---|---|---|
| 2,114,214 | 4/1938 | Damblanc | 102/378 |
| 2,960,034 | 11/1960 | Besserer, Jr. | 102/377 |
| 3,173,627 | 3/1965 | Cohen | 102/377 |
| 3,260,204 | 7/1966 | Wilkey, Jr. | 102/378 |
| 3,304,724 | 2/1967 | Blumrich et al. | 244/172 |
| 3,491,692 | 1/1970 | Blankenagel | 102/377 |
| 3,934,512 | 1/1976 | Adachi | 102/377 |
| 4,723,736 | 2/1988 | Rider | 244/172 |
| 4,964,339 | 10/1990 | Bastian et al. | 102/377 |
| 4,964,340 | 10/1990 | Daniels et al. | 102/377 |

OTHER PUBLICATIONS

ARS Journal, Jun. 1960, pp. 531–536; R. D. Gekler: "Ideal Performance of Multistage Rockets".
American Journal of Physics, vol. 15, Nos. 1–6, 1947, pp. 255–272, The American Institute of Physics; H. S. Seifert: "Physics of Rockets: Dynamics of Long Range Rockets".
Journal of the Aeronautical Sciences, Aug. 1947, pp. 471–480; F. J. Malina: "The Problem of Escape from the Earth by Rocket".
Journal of the British Interplanetary Society, vol. 20, Nov.–Dec. 1965, pp. 177–183; B. Kalitiventzeff: "Various Optimization Methods for Preliminary Cost and Mass Distribution Assessment for Multistage Rocket Vehicles".

Primary Examiner—Margaret A. Focarino
Assistant Examiner—Carla Mattix
Attorney, Agent, or Firm—Helfgott & Karas

[57] ABSTRACT

A space launcher and method for launching satellites and other payloads into space, comprising multi-stage rockets with payload wherein the ratio of the weight of any lower stage rocket to the weight of the rocket stage directly above it is less than two and a half, and wherein the weight of each rocket stage can be defined as that weight of the space launcher, at the start of firing of this stage, minus the weight of the rocket and payload of the stage directly above it at the time when the latter stage rocket begins firing.

16 Claims, 4 Drawing Sheets

SPACE LAUNCHER AND METHOD FOR LAUNCHING OBJECTS INTO SPACE

The present invention relates to a space launcher and a method for the launching of satellites and other payloads into space by means of multi-stage rockets. Specifically the invention concerns a more efficient and economical multi-stage rocket arrangement for space launches.

BACKGROUND OF THE INVENTION

Ever since satellites and other payloads were sent into space, i.e. making more than one complete orbit around the Earth, the method and means for launching these payloads were by use of rockets, particularly multi-stage rockets. Rockets themselves have a long history and their governing principles were well formulated by the time space launches were actually undertaken. See for example Frank J. Malina et al—Journal of the Aeronautical Sciences, Aug. 1947, pages 471-480; Howard S. Seifert et al-American Journal of Physics, volume 15, 1947, pages 255-266; and Richard D. Geckler-ARS Journal, June 1960, pages 531-536. These references and others discuss the principles of multi-stage rockets for space launches and conclude that the optimum arrangement of the various stages of a multi-stage rocket is when the payload ratio is equal for all the stages. This payload ratio is defined for each stage as the ratio of the mass of the carried load or payload to the mass of the rocket at the moment when that stage begins to fire. Thus, for example, in a three-stage rocket with a 100 kg. payload, which is carried in the body of the third stage, the third stage would have a gross mass, including the payload, of about 500 kg. The payload ratio of the third stage is thus 100/500 or 0.2. The third stage is of course launched in flight from the second stage, the gross mass of which including the third stage and payload is 2,500 kg., again giving a payload ratio of 500/3,500 which equals 0.2. The gross mass of the first stage, which is really the entire rocket assembly, is 12,500 kg. and therefore the mass of the second stage is 0.2 of the total mass. In other words, for every weight unit of the space payload, one requires about four weights of the third stage rocket (the stage closest to the payload at the time of launching), about 20 weight units of the middle stage, and about 100 weight units of the lower stage, which is ignited first at the time of launching.

The prior art weight relationship, which was considered optimal, between the various stages of the rocket, is calculated to provide a maximum total velocity at the end of firing all the stages. According to this stage arrangement, the first stage rocket is the heaviest and the weight of each subsequent stage radically decreases. It was calculated that the lower stage rocket must be at least two and one half (2.5) the weight of the stage above it. This makes the development, production and launching of these rockets quite expensive. It has up to now been the conventional theory that a favourable combination of circumstances for space launches is obtained when the payload ratio lies between 0.2 and 0.4.

In other words, when the ratio of the weights of the lower stage to the stages above it lies between 2.5 and 5. To the best of our knowledge, these payload ratios are used today for practically all space launches. According to this prior art, it is mathematically inconsistent to have the lower two rocket stages be equal in weight.

When one takes into consideration the costs of engineering, development, production, maintenance and launching of such rockets, it can well be understood how important it is to be able to reduce the size and weight of each stage of the rocket for maximum efficiency and cost saving.

SUMMARY OF THE INVENTION

The present invention provides an economical space launcher and method for launching satellites and other payloads into space by means of rocket engines operated in stages wherein the ratio of the weight of at least one lower stage to the weight of the stage directly above it is less than two and a half (2.5) and preferably in the range of 0.5 to 1.5. The weight of each stage can be defined here as that weight of the space launcher at the start of firing of this stage, minus the weight of the rockets and payload in the stages directly above it. Thus, the weight of any stage may comprise the combined weight of the fuel consumed by the engine of this stage, the weight of the engine and the weight of the container of this stage, which weights will no longer be present when the next stage rocket is fired.

A most preferred embodiment of the invention is that wherein the ratio of the weights of the first and second stages are less than 2.5, preferably between 0.5 and 1.5. Another embodiment is where the stages other than the first two have ratios of the weights of the lower stage with respect of the stage above it of less than 1.5.

It is to be understood that what is meant by launching into space is the orbiting of the payload around the Earth at least one complete orbit or its escape from Earth.

The multi-stage rocket launcher contemplated in this invention can have many configurations. The simplest one is where the stages are comprises by single rocket engines. However, each stage may also be comprised of a number of rocket engines which operate at the same time during the operation of the stage, without limitation as to the number of rocket engines in each stage. The only limitation being that the relationship between the weights of each stage be maintained, so that the total weight of the lower stage be, as defined above, less than 2.5 of the total weight of the stage directly above it.

The present invention is based on the conception that when launching objects into space, the goal at the end of firing all the stages is to obtain maximum horizontal velocity at a certain height. This goal is different than when launching long-range ballistic missiles, where the goal is to obtain at the end of firing all the stages, maximum total velocity at a defined angle to the horizon (usually more than 20°) at a certain height. Thus the goals for space launching and ballistic missiles are different, both from an energy point of view of the rocket itself and with respect to losses of velocity because of gravity and atmospheric friction.

DETAILED DESCRIPTION OF THE INVENTION

Let us say, for example, that one wishes to put a space satellite or a payload into a low orbit around the Earth by means of a multiple-stage rocket, for example a three-stage rocket. Then according to the prior art multi-stage rockets, the weight ratio between the various stages should be as follows: For every weight unit of the space satellite or payload put into orbit, one requires four weight units of the third stage (the stage closest to the space satellite), about 20 weight units of the middle stage and about 100 weight units of the lower stage, that which is ignited first at the time of launching. For the sake of briefness we can designate these weights in the order of the stages beginning with the lowest stage as follows:

$M_1 = 100M_p$, $M_2 = 20M_p$, $M_3 = 4M_p$ where $M_1$, $M_2$, and $M_3$ are the masses of the first, second and third stages and $M_p$ is the mass of the satellite or payload. According to the invention, however, the two lower stages may be lighter or more equal in weight to one another. Each of the two lower stages will be much lighter than the $M_1$ of the prior art system, but heavier than the $M_2$ of that system. For example, one may take the average between them, i.e. $M_1$ and $M_2$ may each be $60M_p$, although other values may be suitable depending on the definition of the third stage. The third stage may be adapted to the weight of the space satellite or payload and/or the weights of the lower stages. It follows from the above that we can designate the weight ratios according to the invention in the above example as $M_1 = 60M_p$, $M_2 = 60M_p$, $M_3 = 8M_p$. This inventive configuration of stages is more efficient and cost effective for carrying out the task of sending the satellite into space than the prior art method. This configuration may make it necessary to slightly increase the specific impulse (IsP) of the third stage of the configuration.

It can be readily seen that the cost of the space launch configuration of the invention is much smaller in comparison with the cost of the prior art configuration. To illustrate this, let us suppose for example that the cost of each stage, including the cost of development, production, maintenance and launching, depends on the third power of the weight of the stage multiplied by a coefficient K. The relationship between the costs of the aforedescribed embodiment of the invention with stage masses $M_1$, $M_2$ and $M_3$ being equal to $60M_p$, $60M_p$ and $8M_p$, respectively, and the costs of the above-described prior art multi-stage rocket arrangement with $M_1$, $M_2$ and $M_3$ being equal to $100M_p$, $20M_p$ and $4M_p$, respectively, can be calculated as follows:

$$\frac{\text{Invention}}{\text{Prior art}} = \frac{K(60)^3 + K(60)^3 + K(8)^3}{K(100)^3 + K(20)^3 + K(4)^3} = \frac{432,512K}{1,008,064K} = 0.43$$

That is to say, the cumulative cost of the arrangement according to the invention is only 43% of the cumulative cost of the arrangement according to the prior art. It thus becomes apparent that by using the approach of this invention, tremendous cost savings can be achieved even for small payloads and especially for heavy payloads.

Since the third stage is small, i.e. relatively lightweight, it is possible to use systems having a comparatively large IsP and a relatively small engine to propellant weight ratio. In this way it is possible to obtain a high performance of the third stage which counteracts and outweighs the loss in performance, if any, in the second and third stages.

The invention will now be described with reference to the drawings where:

Figure 1:
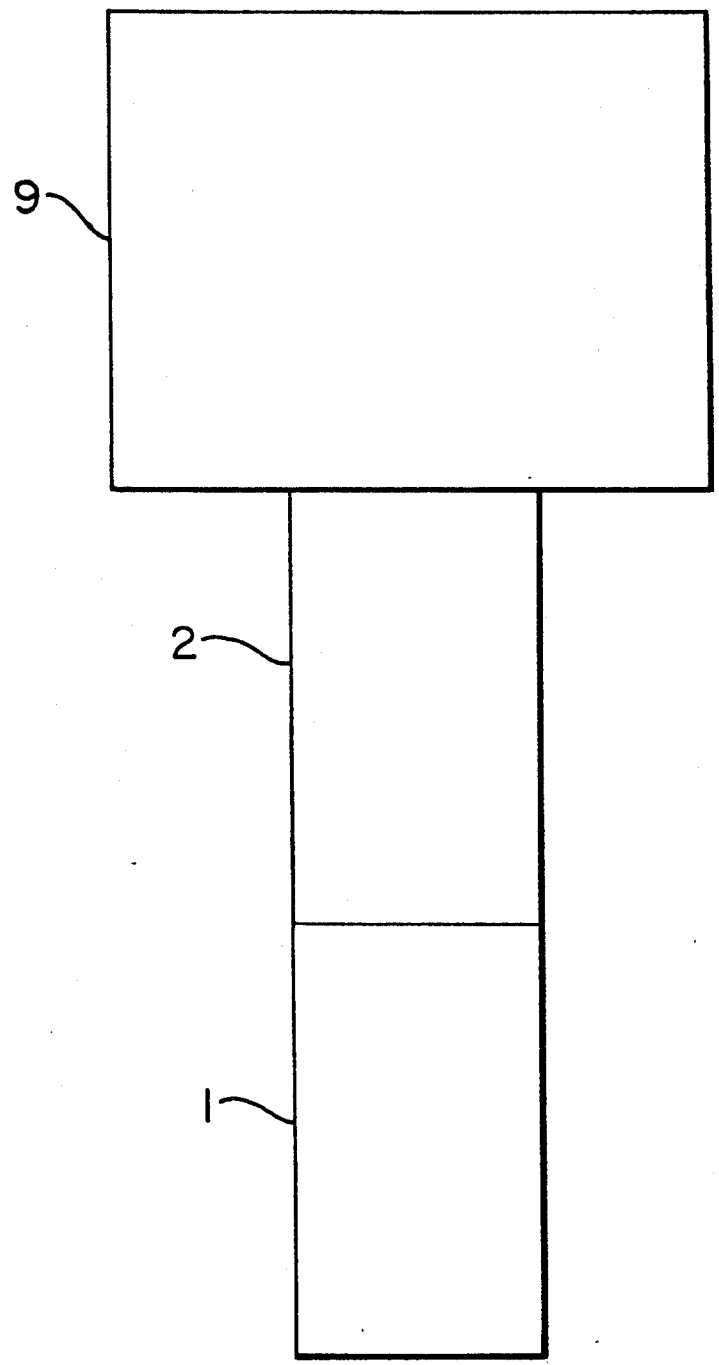
FIG. 1 is a general schematic diagram of a multi-stage launching rocket according to the invention.

Referring now to FIG. 1, this illustrates schematically a multi-stage rocket wherein the first stage 1 is approximately equal in weight to the second stage 2 but could also be greater in weight but less than 2.5 times the weight of the second stage 2, and everything above these first two stages is designated 3. Section 3 may be comprised of a third stage rocket plus a payload such as, for example, a satellite, or it may comprise further multiple-stages of rockets with a payload at the end.

Figure 2:
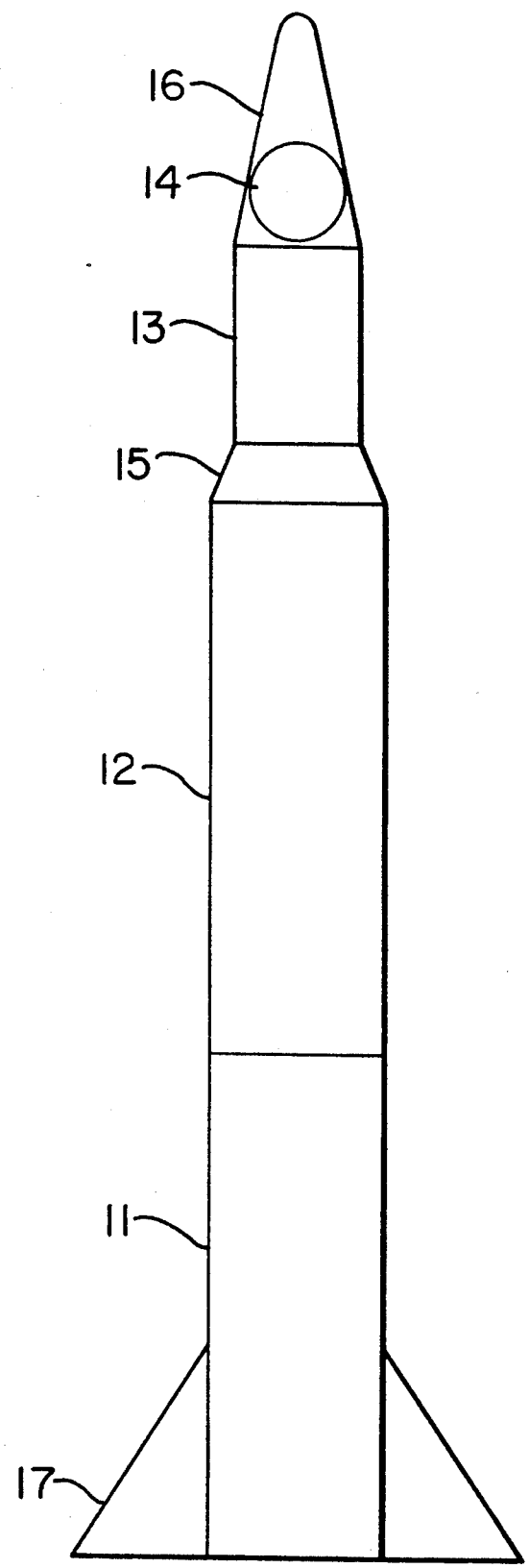
FIG. 2 is a schematic sketch of a three-stage launching rocket of the invention.

FIG. 2 illustrates a three-stage rocket having a first stage rocket 11 with optionally attached wings 17, the second stage rocket 12 having a weight close to that of the first stage 11. In this embodiment, the specific impulse in a vacuum, Isp (vac), of both rocket engines in stages 11 and 12 may be identical. The rocket engine in the second stage 12 is activated after burn-out of rocket engine in first stage 11 and after the casting off of the structure of this first engine. The engine in the third stage 13 can be much lighter than the engine in stage 12. The payload 14 rests on top of third stage 13. An instrument compartment 15 is optionally stationed between stages 12 and 13. A protective cover 16 surrounds the payload 14 and protects it from atmospheric friction at the time of launch and allows an easy aerodynamic stream so that friction in the atmosphere will be minimal. This cover 16 may be discarded once the satellite is sufficiently high where there is sufficiently thin atmosphere.

Figure 3:
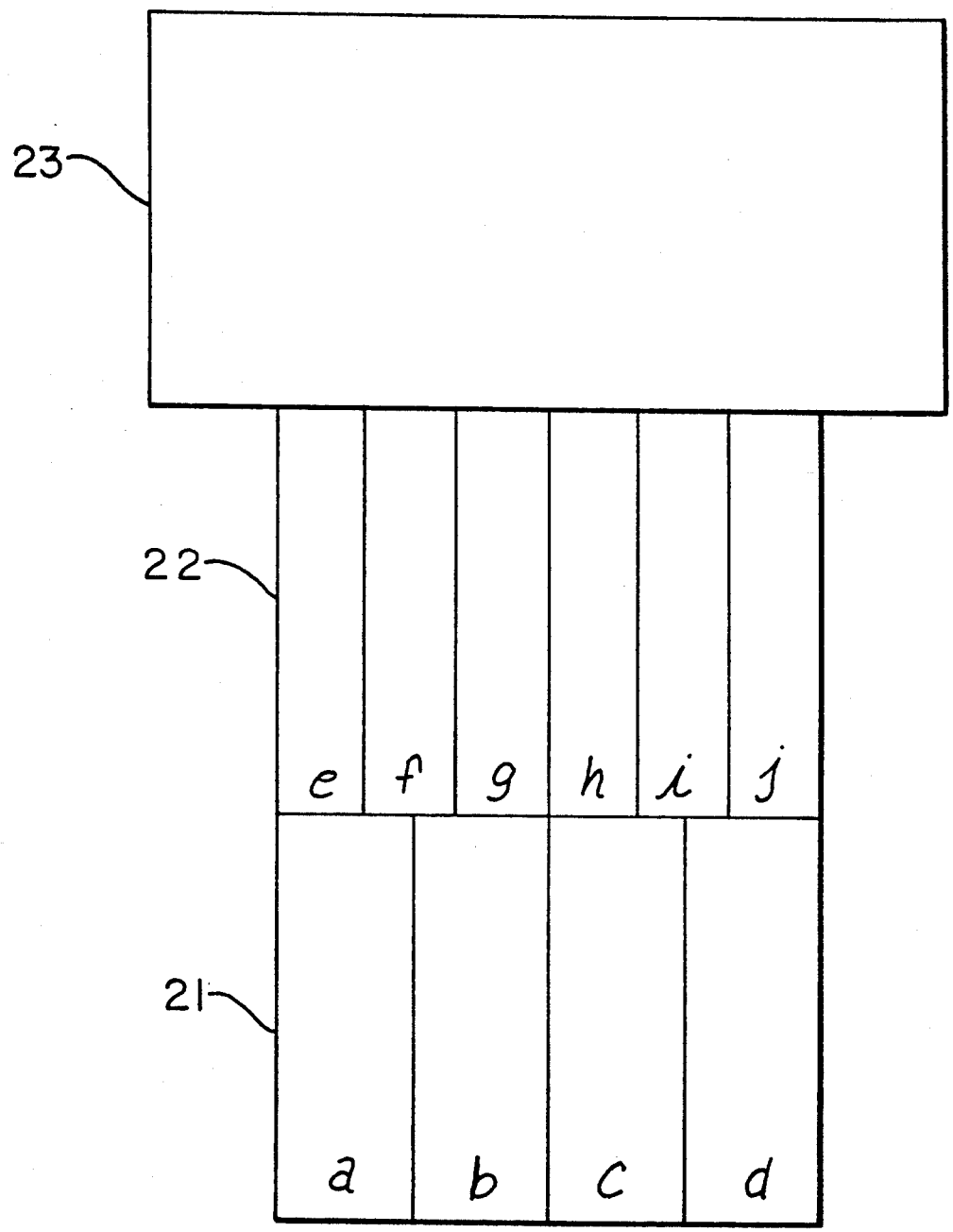
FIG. 3 is a schematic sketch of another embodiment of the invention.

Referring now to FIG. 3, we see that the first 21 and second 22 stages of the multiple-stage space launcher comprise a number of rocket engines each, designated a-d in the first stage 21 and e-j in the second stage 22 respectively. The rocket engines in each stage operate together until the end of firing and then they may be cast off either individually or together before the commencement of the operation of the subsequent stage. The stage 23 above the second stage 22 may be the payload or additional rocket stages with a payload at the end.

Figure 4:
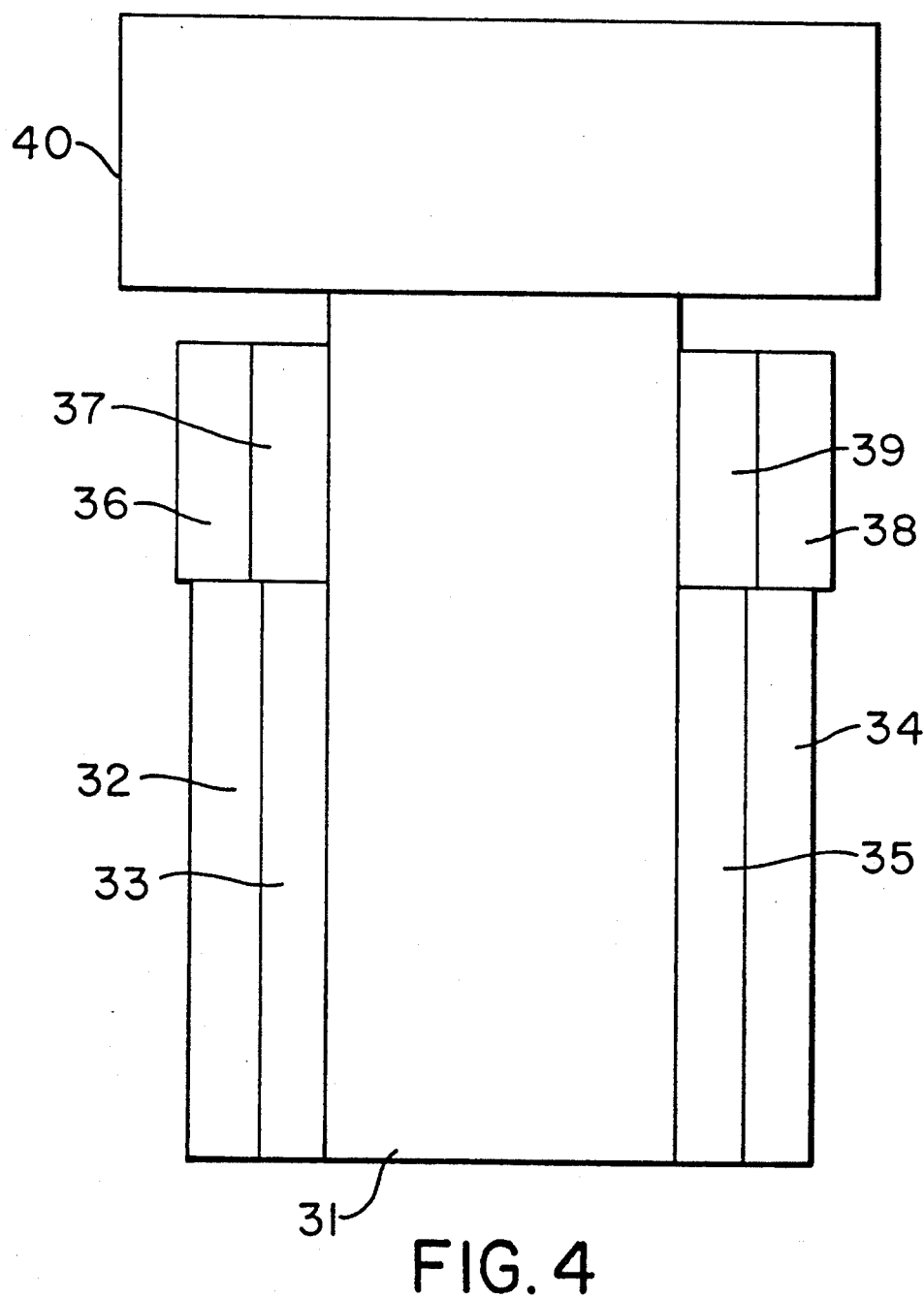
FIG. 4 is a schematic sketch of yet another embodiment according to the invention.

FIG. 4 describes yet another rocket arrangement wherein a main rocket engine 31 fires through a number of stages. In this arrangement the main rocket engine 31 is surrounded by booster rockets 32, 33, 34, 35 which are part of stage one, and booster rockets 36, 37, 38, 39 which are part of stage two. Rockets 32, 33, 34 and 35 are fired together and when these rockets are consumed they are discarded while rocket 31 continues firing. At this point stage two begins. The mass of stage one comprised the original weight of rocket boosters 32, 33, 34 and 35 plus the weight of the consumed fuel in the main rocket 31. The booster rockets 36, 37, 38 and 39 are fired in stage two and this stage ends when these booster rockets 36, 37, 38 and 39 are discarded either together with the main rocket 31 or without it. In the latter case the weight of fuel consumed by main rocket 31 during stage two is included in calculating the weight of this stage. The remainder of the space launcher 40 may include further stages of rockets and a payload. The space shuttle operates on a somewhat similar rocket configuration but with prior art weight ratio arrangement of rockets, whereas according to this invention the total weight of the first stage with respect to the weight of the second stage is less than 2.5.

I claim:

1. A multi-stage space launcher for launching satellites and other payloads into space for orbiting around the Earth at least one complete orbit, the launcher comprising a plurality of rocket stages and a payload, wherein each rocket stage has at the start of firing thereof a weight comprised of a combined weight of a fuel consumed by an engine of a respective stage, the weight of the engine and the weight of a container of said respective stage, said combined weight of said respective rocket stage being no longer present when a next stage located in the launcher above said respective stage is fired, and wherein the ratio of the weight of any lower rocket stage to the weight of the rocket stage directly above it is between 0.5 and less than 2.5.

2. A space launcher as in claim 1 wherein said weight ratio is between 0.5 and 1.5.

3. A space launcher as in claim 1 wherein the rocket stages include rocket engines selected from the group consisting of solid rocket engines, liquid rocket engines or hybrid rocket engines.

4. A space launcher as in claim 1 wherein two lower rocket stages comprise only one rocket engine each.

5. A multi-stage space launcher for launching satellites and other payloads into space for orbiting around the Earth at least one complete orbit, the launcher comprising a plurality of rocket stages and a payload, wherein each rocket stage has at the start of firing thereof a weight comprised of a combined weight of a fuel consumed by an engine of a respective stage, the weight of the engine and the weight of a container of said respective stage, said combined weight being no longer present when a next stage located in the launcher above said respective stage is fired, wherein the weight ratio between two lower rocket stages is less than two and one half.

6. A multi-stage space launcher for launching satellites and other payloads into space for orbiting around the Earth at least one complete orbit, the launcher comprising a plurality of rocket stages and a payload, wherein two lower rocket stages each comprise a plurality of rocket engines and each said lower rocket stage has at the start of firing thereof a weight comprised of a combined weight of a fuel consumed by the engines of a respective stage, the weight of the engines and the weight of a container of said respective stage, said combined weight being no longer present when a next stage located in the launcher above said respective stage is fired, wherein the weight ratio of a lowest stage to the rocket stage directly above it is less than two and a half.

7. A three-stage space launcher for launching satellites and other payloads into space for orbiting around the Earth at least one complete orbit, the launcher comprising two lower rocket stages of almost equal weight wherein each stage includes at least one rocket engine, the engines of the two lower stages having almost equal specific impulse in a vacuum, Isp(vac).

8. A space launcher as in claim 7 wherein a third rocket stage from a lower end of the launcher is much lighter than a second rocket stage from said end and has an Isp (vac) equal to or higher than that of the second rocket stage from said end and the weight ratio of an engine of the third rocket stage to its propellent weight is smaller than the same weight ratio in the second rocket stage.

9. A method for launching satellites and other payloads into space for orbiting around the Earth at least one complete orbit, comprising launching a multiple-stage rocket with a payload at an end thereof into space wherein the ratio of a weight of any lower rocket stage to the weight of a rocket stage directly above it is between 0.5 and less than 2.5, and wherein a weight of each rocket stage is defined as the weight at the start of firing thereof comprised of a combined weight of a fuel consumed by an engine of a respective rocket state, the weight of the engine and the weight of a container of said respective rocket stage, said combined weight of said respective rocket stage being no longer present when a next rocket stage located in the launcher above said respective rocket stage is fired.

10. A method as in claim 9 wherein said weight ratio is between 0.5 and 1.5.

11. A method as in claim 9 wherein the rocket stages include rocket engines selected from the group consisting of solid rocket engines, liquid rocket engines or hybrid rocket engines.

12. A method as in claim 9 wherein two lower rocket stages comprise only one rocket engine each.

13. A method for launching satellites and other payloads into space for orbiting around the Earth at least one complete orbit, comprising launching a multiple-stage rocket with a payload at an end thereof into space wherein a weight of each rocket stage is defined as the weight at the start of firing thereof comprised of a combined weight of a fuel consumed by an engine of a respective rocket stage, the weight of the engine and the weight of a container of said respective rocket stage, said combined weight being no longer present when a next rocket stage located in the launcher above said respective rocket stage is fired, wherein the weight ratio between two lower rocket stages is less than two and one half.

14. A method for launching satellites and other payloads into space for orbiting around the Earth at least one complete orbit, comprising launching a multiple-stage rocket with a payload at an end thereof into space wherein two lower rocket stages each comprise a plurality of rocket engines and wherein a weight of each said lower rocket stage is defined as the weight at the start of firing thereof comprised of a combined weight of a fuel consumed by the engines of a respective rocket stage, the weight of the engines and the weight of a container of said respective rocket stage, said combined weight being no longer present when a next rocket stage located in the launcher above said respective rocket stage is fired, wherein the weight ratio between a lowest rocket stage and a rocket stage directly above the lowest rocket stage is less than two and a half.

15. A method for launching a satellite or other payload into space, the method comprising providing a three-stage rocket having a payload at an end thereof wherein two lower rocket stages are of almost equal weight before being fired and wherein the rocket stages include rocket engines having a specific impulse in a vacuum, Isp (vac), almost equal for the lower two stages, and launching the three-stage rocket into space for orbiting a satellite or other payload around the Earth at least one complete orbit.

16. A multi-stage launcher for launching satellites and other payloads into space for orbiting around the Earth at least one complete orbit, the launcher comprising a plurality of rocket stages and a payload, wherein each rocket stage has at the start of firing thereof a weight comprised of a combined weight of a fuel consumed by an engine of a respective stage, the weight of the engine and the weight of a container of said respective stage, said combined weight of said respective rocket stage being no longer present when a next stage located in the launcher above said respective stage is fired and wherein the ratio of the weight of any lower rocket stage to the weight of a rocket stage directly above it is between 0.5 and 1.5.

* * * * *

UNITED STATES PATENT AND TRADEMARK OFFICE
CERTIFICATE OF CORRECTION

PATENT NO. : 5,172,875
DATED : December 22, 1992
INVENTOR(S) : Israel Fried

It is certified that error appears in the above-identified patent and that said Letters Patent is hereby corrected as shown below:

On the title page, after Assignee, add the following:

[*] Notice: The last thirteen months of the term of this patent has been disclaimed.

On the title page, item (76) inventors, addresss should read--
[76] Inventor: Israel Fried, c/o 1920 N St., NW.
Suite 660
Washington, D.C. 20036

--.

Signed and Sealed this

Twenty-sixth Day of April, 1994

Attest:

BRUCE LEHMAN

Attesting Officer

Commissioner of Patents and Trademarks